United States Patent Office 2,902,344
Patented Sept. 1, 1959

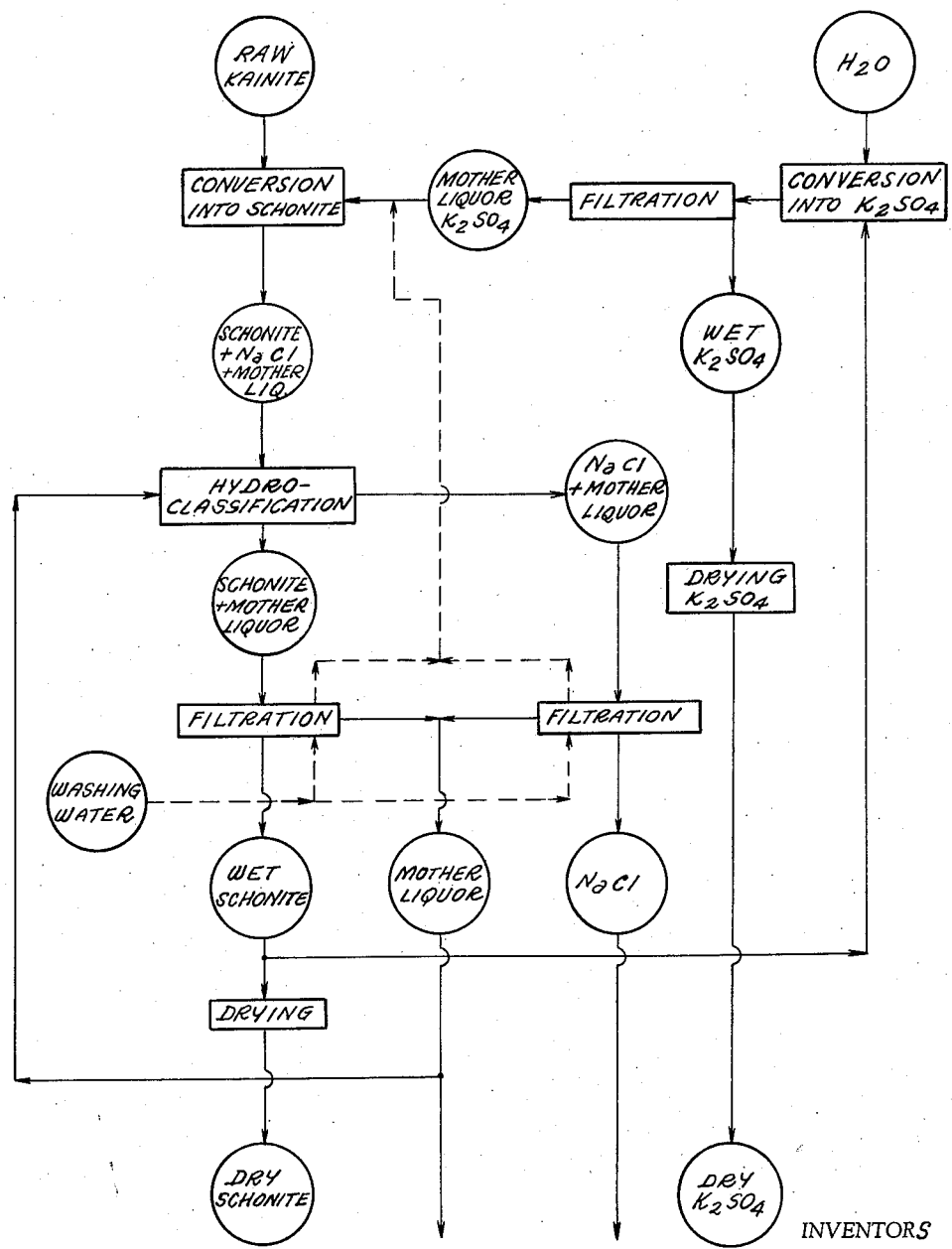

2,902,344

PROCESS FOR THE PREPARATION OF HYDROUS POTASSIUM MAGNESIUM SULFATE AND POTASSIUM SULFATE FROM KAINITE CONTAINING SODIUM CHLORIDE

Guidobaldo Cevidalli, Fulvio Marchi, and Pietro Saccardo, Milan, Italy, assignors to Sincat Società Industriale Catanese S.p.A., Milan, Italy Application March 6, 1957, Serial No. 644,207

Claims priority, application Italy September 14, 1956

3 Claims. (Cl. 23—121)

The present invention relates to the manufacture of hydrous potassium magnesium sulfate and of potassium sulfate from potassium chloride-magnesium sulfate minerals, such as kainite.

The difficulties connected with the processing of kainite have been set out in the copending patent application Ser. No. 644,206. This latter specification claims a process for the conversion of kainite into hydrous potassium magnesium sulfate, such as schoenite or leonite, by reaction with water in a known manner, wherein the naturally present sodium chloride is removed by the addition to the reaction mixture of a separating liquor in which the coarser sodium chloride crystals settle more rapidly than the finer schoenite or leonite crystals, so that the latter can be removed from the former by decantation or the like operation. According to the cognate invention, the mother liquor remaining after the separation of the schoenite or leonite crystals from the sodium chloride sediment are used as the separating liquor.

The present invention provides a process for the manufacture of hydrous potassium magnesium sulfate by the decomposition of kainite, combined with the manufacture of potassium sulfate by decomposition of the hydrous potassium magnesium sulfate with water, wherein the decomposition of the kainite is effected by means of brines consisting of or containing the salt solution that constitute the runoff of the decomposition of the hydrous potassium magnesium sulfate.

The washing liquors running off from the potassium magnesium sulfate and/or those from the sodium chloride in the first stage may also be used for the decomposition of the kainite.

In this manner, the potassium sulfate which is a more valuable product for use as a fertilizer than the hydrous potassium magnesium sulfate, can be produced in a cycle of operations which starts with the decomposition of the kainite and in which the circulation of liquids as well as the potassium losses in the rejected end brines are reduced to a minimum. The residual potassium contents of the rejected end brines, which are of the order of 2–3% by weight, may, if desired, be recovered by known processes.

The decomposition of the kainite into schoenite and $MgCl_2$ and the separation of the potassium magnesium sulfate fines from the coarser sodium chloride proceeds in principle in the manner described in specification Ser. No. 644,206.

The subsequent decomposition of the hydrous potassium magnesium sulfate is effected by water in a known manner, preferably at about 45° C. at which temperature the ratio of solubilities of potassium sulfate and magnesium sulfate is most favourable for dissolving a maximum of magnesium sulfate and a minimum of potassium sulfate.

The entire cycle of operation can thus briefly be summarized with reference to the attached drawing which shows a comprehensive flow sheet of the overall kainite conversion procedure.

(a) Kainite is decomposed with mother liquor from the separation of potassium sulfate (step (d) below);

(b) The reaction mixture is admixed with a separating liquor, preferably the mother liquor from a preceding separation (step (c) below);

(c) The potassium magnesium sulfate (schoenite or leonite) fines are separated from the sodium chloride sediment by decantation or the like, the decantated liquor is filtered, the filtrate is recycled to step (b) hereinbefore; the filter residue and NaCl are washed separately, the washing liquors are optionally recycled to step (b);

(d) The residue of step (c), being schoenite or leonite, is decomposed with water, preferably at about 45° C., the reaction mixture is filtered;

(e) The filtrate from step (d) is recycled to the decomposition of kainite (step (a)); the filter residue is potassium sulfate.

The invention is illustrated by the following examples to which it is not limited.

Example 1

138 g. of schoenite of any desired provenience of the following composition (percent by weight):

| K· | Mg·· | $SO_4''$ | Ca·· | Na· | Cl' | $H_2O$ |
|---|---|---|---|---|---|---|
| 16.8 | 5.77 | 45.2 | 0.4 | 0.49 | 0.11 | 31.3 | is shaken at 45° with 138 cc. of water. Most of the magnesium sulfate dissolved while most of the potassium sulfate remains undissolved. The mixture is filtered, the filter residue is dried.

It consists of 21.83 g. of $K_2SO_4$ of the following composition (percent by weight):

| K· | ($K_2O$) | Mg·· | $SO_4''$ | Ca·· | Cl' | $H_2O$ |
|---|---|---|---|---|---|---|
| 41.6 | (50.01) | 0.67 | 54.6 | 0.42 | traces | 2.5 |

The filtrate (245 g.) is mixed, as a decomposition brine, with 204 g. of crude kainite ground to a fineness so as to pass a 35 mesh sieve and having the following composition (percent in weight):

| K· | Mg·· | $SO_4''$ | Cl' | Na· | Ca·· | $H_2O$ |
|---|---|---|---|---|---|---|
| 11.33 | 6.98 | 28.83 | 26.37 | 10.8 | 0.12 | 15.52 |

The mixture is vigorously shaken first at 40° C., then at 20° C. The supernatant containing the bulk of the schoenite thus produced in very fine crystals in suspension is separated from the rapidly settling coarser crystals of NaCl. The separation may be repeated, if desired, upon the addition of some more separating liquor.

The decanted liquor is filtered. The filtrate is recycled as a separating liquor to the stage where the schoenite is separated from sodium chloride.

The schoenite is washed with little water and filtered off. The yield is 171.1 g. of schoenite of a similar composition as indicated above in this example.

After drying at 80° C., the product weighs 151.8 g. and has the following composition:

| K· | Mg·· | $SO_4''$ | Cl' | Ca· | Na·· | $H_2O$ |
|---|---|---|---|---|---|---|
| 18.96 | 6.52 | 50.99 | 0.13 | 0.45 | 0.41 | 22.20 |

The sodium chloride is filtered off, washed and dried. The yield is 31.4 g. of the following composition:

| K· | Mg·· | SO₄″ | Cl′ | Na· | Ca·· | H₂O |
|---|---|---|---|---|---|---|
| 1.17 | 0.50 | 4.41 | 55.8 | 36.45 | 0.08 | ------- |

In this example the washing waters are rejected. The yield in potassium is about 63%.

*Example 2*

245 g. of mother liquors (filtrate) obtained in the decomposition of the schoenite to the K₂SO₄ according to Example 1 is combined with 82 g. of the washing waters running off the schoenite and NaCl in the first stage of the operation described in Example 1. The combined liquor is used for the decomposition of 264 g. of crude kainite of the same composition as in Example 1. In the manner described in Example 1, 185.5 g. of schoenite of the following composition (percent by weight) is obtained:

| K· | Mg·· | SO₄″ | Na· | Ca·· | Cl′ | H₂O |
|---|---|---|---|---|---|---|
| 18.57 | 6.45 | 52.22 | 1.95 | 0.16 | 0.35 | 20.12 |

The yield of NaCl is 44.3 g. of the following composition (percent by weight):

| K· | Mg·· | SO₄″ | Ca·· | Na· | Cl′ | H₂O |
|---|---|---|---|---|---|---|
| 1.27 | 0.50 | 3.58 | 0.16 | 33.5 | 51.94 | 7.50 |

The total potassium yield is about 68%.

*Example 3*

245 g. of brine resulting from the conversion of schoenite to K₂SO₄ is combined with 110 g. of mother liquor resulting from the decomposition of kainite to schoenite, both as described in Example 1. The combined liquor is used as decomposition and separating liquor for 292 g. of kainite ground to a degree of fineness so as to pass through a 35 mesh sieve and having the following composition (percent by weight):

| K· | Mg·· | SO₄″ | Cl′ | Na· | Ca·· | H₂O |
|---|---|---|---|---|---|---|
| 6.98 | 4.03 | 19.20 | 38.5 | 21.9 | 0.44 | 8.95 |

The yield of schoenite is 140.2 g. of the following composition:

| K· | Mg·· | SO₄″ | Cl′ | Na· | Ca·· | H₂O |
|---|---|---|---|---|---|---|
| 18.37 | 6.40 | 53.95 | 0.79 | 3.27 | 0.16 | 17.01 |

The yield of NaCl is 125.5 g. It contains 0.75% of K.

Part of all of this schoenite is further processed to produce K₂SO₄ in the manner described in Example 1.

What we claim is:

1. In a process for the conversion of natural kainite containing sodium chloride as an impurity into potassium sulfate and magnesium-potassium sulfate involving the steps of: (1) decomposing the kainite by contact with an aqueous medium in about the stoichiometric quantity for dissolving all the resulting magnesium chloride; and (2) then separating the resulting magnesium-potassium sulfate suspended in said medium from undissolved sodium chloride crystals, the improvement which comprises contacting recovered magnesium-potassium sulfate with water, thereby forming a suspension of potassium sulfate in a magnesium sulfate mother liquor, recovering the suspended potassium sulfate, and employing the mother liquor remaining as the aqueous medium for decomposing the kainite.

2. The process of claim 1 in which the treatment of magnesium-potassium sulfate with water is effected at about 45° C.

3. The process of claim 1 in which the NaCl and the potassium-magnesium sulphate are separately washed with water, and the resulting washing waters are employed together with the mother liquors of potassium sulphate for the conversion of other raw kainite.

References Cited in the file of this patent
UNITED STATES PATENTS 229,249    Hake _____ June 29, 1880
1,244,884   Nagelvoort _____ Oct. 30, 1917

OTHER REFERENCES

Mellor: Comprehensive Treatise on Inorganic and Theoretical Chemistry, vol. 4, p. 340, 1923, Longmans, Green and Co., N.Y.